US009324363B2

(12) United States Patent
Tan et al.

(10) Patent No.: US 9,324,363 B2
(45) Date of Patent: Apr. 26, 2016

(54) SYSTEMS AND METHODS FOR FLOATING VARIANCE BRANCH METRIC CALCULATION

(71) Applicant: LSI Corporation, San Jose, CA (US)

(72) Inventors: Weijun Tan, Longmont, CO (US);
Shaohua Yang, San Jose, CA (US);
Xuebin Wu, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 181 days.

(21) Appl. No.: 13/945,216

(22) Filed: Jul. 18, 2013

(65) Prior Publication Data

US 2014/0362461 A1     Dec. 11, 2014

Related U.S. Application Data

(60) Provisional application No. 61/831,590, filed on Jun. 5, 2013.

(51) Int. Cl.
*G11B 5/09*   (2006.01)
*G11B 20/10*  (2006.01)

(52) U.S. Cl.
CPC .... *G11B 20/10046* (2013.01); *G11B 20/10268* (2013.01)

(58) Field of Classification Search
CPC .. G11B 27/36; G11B 5/012; G11B 20/10009; G11B 5/09; G11B 2220/90
USPC .............................. 360/31, 39, 29, 32, 53, 65
See application file for complete search history.

(56) References Cited

U.S. PATENT DOCUMENTS

| | | | |
|---|---|---|---|
| 6,166,872 A | 12/2000 | Uno et al. | |
| 6,535,553 B1 | 3/2003 | Limberg et al. | |
| 6,804,695 B1 | 10/2004 | Hsu | |
| 7,248,630 B2 | 7/2007 | Modrie | |
| 7,257,764 B2 | 8/2007 | Suzuki | |
| 7,421,017 B2 | 9/2008 | Takatsu | |
| 7,502,189 B2 | 3/2009 | Sawaguchi | |
| 7,715,471 B2 | 5/2010 | Werner | |
| 8,018,360 B2 | 9/2011 | Nayak | |
| 8,046,666 B2 | 10/2011 | Park et al. | |
| 8,184,390 B1 | 5/2012 | Xia et al. | |
| 8,208,213 B2 | 6/2012 | Liu | |
| 8,479,086 B2 | 7/2013 | Xia et al. | |
| 8,667,039 B2 * | 3/2014 | Ivkovic et al. | ................ 708/322 |
| 2002/0094044 A1 | 7/2002 | Kolze et al. | |
| 2004/0071206 A1 | 4/2004 | Takatsu | |
| 2005/0025076 A1 | 2/2005 | Chaudhuri | |
| 2005/0249318 A1 | 11/2005 | Minemura | |
| 2006/0123285 A1 | 6/2006 | De Araujo | |
| 2006/0176947 A1 | 8/2006 | Lim | |

(Continued)

OTHER PUBLICATIONS

U.S. Appl. No. 13/597,046, Unpublished (filed Aug. 28, 2012) (Lu Pan).

(Continued)

*Primary Examiner* — Nabil Hindi (57) ABSTRACT

The present inventions are related to systems and methods for data processing, and more particularly to systems and methods for data detection. As one example, a data processing system is described that includes a variance calculation circuit operable to calculate a variance of a data input; and a branch metric calculation circuit operable to calculate a branch metric based at least in part on the variance.

20 Claims, 6 Drawing Sheets

(56) References Cited

U.S. PATENT DOCUMENTS

| | | |
|---|---|---|
| 2006/0227903 A1 | 10/2006 | Niu et al. |
| 2006/0259263 A1 | 11/2006 | Ashley et al. |
| 2007/0263310 A1 | 11/2007 | Ikeda et al. |
| 2007/0297496 A1 | 12/2007 | Park |
| 2008/0104486 A1 | 5/2008 | Kanaoka |
| 2009/0002862 A1 | 1/2009 | Park et al. |
| 2009/0161245 A1 | 6/2009 | Mathew et al. |
| 2009/0161747 A1 | 6/2009 | Aziz et al. |
| 2009/0268575 A1 | 10/2009 | Tan et al. |
| 2011/0072335 A1 | 3/2011 | Liu et al. |
| 2011/0075569 A1 | 3/2011 | Marrow |
| 2011/0164332 A1 | 7/2011 | Cao |
| 2011/0167227 A1 | 7/2011 | Yang et al. |
| 2011/0242692 A1* | 10/2011 | Blinick et al. ............ 360/31 |
| 2012/0019946 A1 | 1/2012 | Aravind |
| 2012/0056612 A1 | 3/2012 | Mathew |
| 2012/0069891 A1 | 3/2012 | Zhang |
| 2012/0124119 A1 | 5/2012 | Yang |
| 2012/0236430 A1 | 9/2012 | Tan |
| 2013/0182347 A1* | 7/2013 | Maeto ....................... 360/39 |

OTHER PUBLICATIONS

U.S. Appl. No. 13/535,799, Unpublished (filed Jun. 28, 2012) (Madhusudan Kalluri).

U.S. Appl. No. 13/551,507, Unpublished (filed Jul. 17, 2012) (Ming Jin).

U.S. Appl. No. 13/562,140, Unpublished (filed Jul. 30, 2012) (Haotian Zhang).

U.S. Appl. No. 13/525,188, Unpublished (filed Jun. 15, 2012) (Yang Han).

U.S. Appl. No. 13/491,062, Unpublished (filed Jun. 7, 2012) (Jin Lu).

U.S. Appl. No. 13/525,182, Unpublished (filed Jun. 15, 2012) (Yang Han).

U.S. Appl. No. 13/346,556, Unpublished (filed Jan. 9, 2012) (Haitao Xia).

U.S. Appl. No. 13/239,719, Unpublished (filed Sep. 22, 2011) (Haitao Xia).

U.S. Appl. No. 13/272,209, Unpublished (filed Oct. 12, 2011) (Yu Liao).

U.S. Appl. No. 13/545,784, Unpublished (filed Jul. 10, 2012) (Yu Liao).

\* cited by examiner

SYSTEMS AND METHODS FOR FLOATING VARIANCE BRANCH METRIC CALCULATION

CROSS REFERENCE TO RELATED APPLICATIONS

The present application claims priority to (is a non-provisional of) U.S. Patent Application No. 61/831,590, entitled "Systems and Methods for Floating Variance Branch Metric Calculation", and filed Jun. 5, 2013 by Tan et al. The entirety of the aforementioned provisional patent application is incorporated herein by reference for all purposes.

BACKGROUND OF THE INVENTION

The present inventions are related to systems and methods for data processing, and more particularly to systems and methods for data detection.

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function receives data sets and applies a data detection algorithm and a data decode algorithm to the data sets to recover an originally written data set. In some cases, changes in data from one data set to the next may be significant enough that the range of processing becomes negatively impacted from one data set to the next, thus reducing the accuracy of the data processing.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for data detection.

Some embodiments of the present invention provide data processing systems that include a variance calculation circuit and a branch metric calculation circuit. The variance calculation circuit is operable to calculate a variance of a data input. The branch metric calculation circuit is operable to calculate a branch metric based at least in part on the variance.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for data detection.

Various embodiments of the present invention provide for data processing systems that include noise predictive filter calibration circuitry and/or branch metric calculation circuitry combined as floating variance calibration and detection circuitry that make use of variance information to determine branch metric values for use in a data detector circuit. In some cases, a variance is calculated for each condition, and these variance values are used to calculate respective branch metrics.

Some embodiments of the present invention provide data processing systems that include a variance calculation circuit and a branch metric calculation circuit. The variance calculation circuit is operable to calculate a variance of a data input. The branch metric calculation circuit is operable to calculate a branch metric based at least in part on the variance. In some instances of the aforementioned embodiments, the system is implemented as part of an integrated circuit. In variance instances of the aforementioned embodiments, the data processing system is incorporated in a storage device. In other instances of the aforementioned embodiments, the data processing system is incorporated in a data communication device.

In some instances of the aforementioned embodiments, the branch metric calculation circuit is a first branch metric calculation circuit, the branch metric is a first branch metric, and the system further includes a second branch metric calculation circuit operable to calculate a second branch metric based at least in part on the variance. In some cases, the system further includes a first adaptive tap calculation circuit operable to calculate a first portion of a first tap set based upon the data input, wherein a second portion of the first tap set is a tap value, and a first noise predictive filter operable to apply noise predictive filtering to the data input using the first tap set to yield a first filtered output. The first branch metric calculation circuit is further operable to calculate the first branch metric based upon both the variance and the first filtered output. In some cases, the tap value is a fixed tap value. In other cases, the tap value is a programmable tap value. In various instances of the aforementioned embodiments, the systems further include: a mean absolute value calculation circuit operable to calculate a mean absolute value of the first filtered output; a second adaptive tap calculation circuit operable to calculate a first portion of a second tap set based upon the data input; a third adaptive tap calculation circuit operable to calculate a second portion of the second tap set based upon the mean absolute value of the first filtered output; a second noise predictive filter operable to apply noise predictive filtering to the data input using the second tap set to yield a second filtered output, where the second branch metric calculation circuit is further operable to calculate the second branch metric based upon both the variance and the second filtered output.

In various instances of the aforementioned embodiments, the branch metric calculation circuit is a first branch metric calculation circuit, the branch metric is a first branch metric, the variance is a first variance specific to a condition of the first branch metric, the variance calculation circuit is a first variance calculation circuit, and the system further includes: a second variance calculation circuit operable to calculate a second variance of the data input, where the second variance is specific to a condition of a second branch metric; and a second branch metric calculation circuit operable to calculate a second branch metric based at least in part on the second variance. In some cases, the system further includes: a first adaptive tap calculation circuit operable to calculate a first portion of a first tap set based upon the data input, where a second portion of the first tap set is a first tap value; and a first noise predictive filter operable to apply noise predictive filtering to the data input using the first tap set to yield a first filtered output, where the first branch metric calculation circuit is further operable to calculate the first branch metric based upon both the variance and the first filtered output. In some such cases, the systems further include: a second adaptive tap calculation circuit operable to calculate a first portion of a second tap set based upon the data input, where a second portion of the second tap set is a second tap value; and a second noise predictive filter operable to apply noise predictive filtering to the data input using the second tap set to yield a second filtered output, where the second branch metric calculation circuit is further operable to calculate the second branch metric based upon both the variance and the second filtered output.

Other embodiments of the present invention provide methods for data processing that include: receiving a data input; calculating a variance of the data input using a variance calculation circuit; and calculating a branch metric based at least in part on the variance. In some instances of the aforementioned embodiments, the branch metric is a first branch metric, and the method further includes calculating a second branch metric based at least in part on the variance. In some cases, the methods further include: adapting a first portion of a first tap set based upon the data input, where a second portion of the first tap set is a tap value; and applying noise predictive filtering to the data input using the first tap set to yield a first filtered output, where the first branch metric is further based upon the first filtered output. In various instances of the aforementioned embodiments, the methods further include: calculating a mean absolute value of the first filtered output; adapting a first portion of a second tap set based upon the data input; adapting a second portion of the second tap set based upon the mean absolute value of the first filtered output; and applying noise predictive filtering to the data input using the second tap set to yield a second filtered output, where the second branch metric is further based upon the second filtered output.

Figure 1:
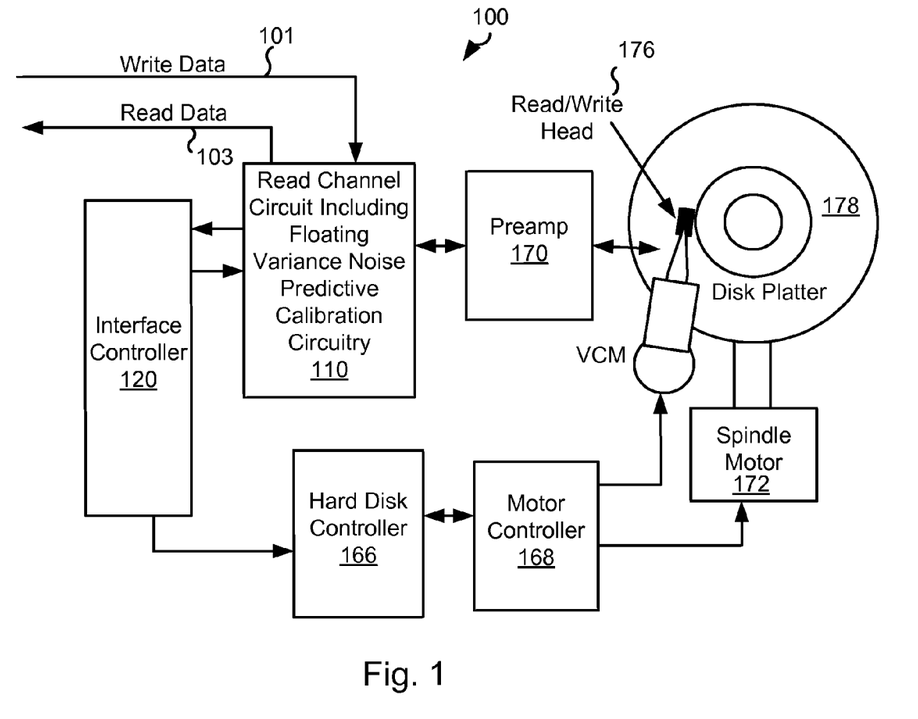
FIG. 1 shows a storage system including floating variance calibration and detection circuitry in accordance with various embodiments of the present invention.

Turning to FIG. 1, a storage system 100 including a read channel circuit 110 having floating variance calibration and detection circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103. The opposite is a write operation where write data 101 is provided to read channel circuit 110 that encodes the data and stores it to disk platter 178 via preamplifier 170 and read/write head assembly 176.

As part of processing data accessed from disk platter 178, read channel circuit 110 applies a data detection algorithm to data accessed from disk platter 178 to yield a detected output. Application of the data detection algorithm includes applying noise predictive filtering and calculate variance of the data accessed from disk platter 178. The output of the noise predictive filtering and the variance are used to calculate variance dependent branch metric values that are used to guide the data detection algorithm. The resulting detected output is decoded to, where no errors occur, recover an originally written data set. In some cases, read channel circuit 110 may include a data processing circuit similar to that discussed below in relation to FIG. 3, and one of FIGS. 4a-4b; and/or may apply data processing similar to that discussed below in relation to FIGS. 5a-5b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
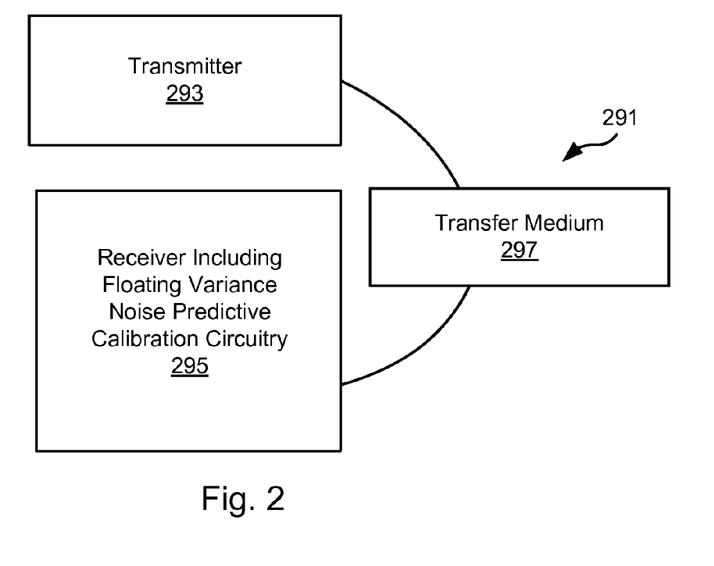
FIG. 2 depicts a data transmission system including floating variance calibration circuitry in accordance with one or more embodiments of the present invention.

Turning to FIG. 2, a data transmission system 291 including a receiver 295 having floating variance calibration and detection circuitry is shown in accordance with various embodiments of the present invention. Data transmission system 291 includes a transmitter 293 that is operable to transmit encoded information via a transfer medium 297 as is known in the art. The encoded information is received from transfer medium 297 by a receiver 295. Receiver 295 processes a received input representing the encoded information to yield the originally transmitted data.

As part of processing data received by receiver 295, receiver 295 applies a data detection algorithm to data accessed from disk platter transfer medium 297 to yield a detected output. Application of the data detection algorithm includes applying noise predictive filtering and calculate variance of the data received from transfer medium 297. The output of the noise predictive filtering and the variance are used to calculate variance dependent branch metric values that are used to guide the data detection algorithm. The resulting detected output is decoded to, where no errors occur, recover an originally written data set. In some cases, receiver 295 may include a data processing circuit similar to that discussed below in relation to FIG. 3, and one of FIGS. 4a-4b; and/or may apply data processing similar to that discussed below in relation to FIGS. 5a-5b.

Figure 3:
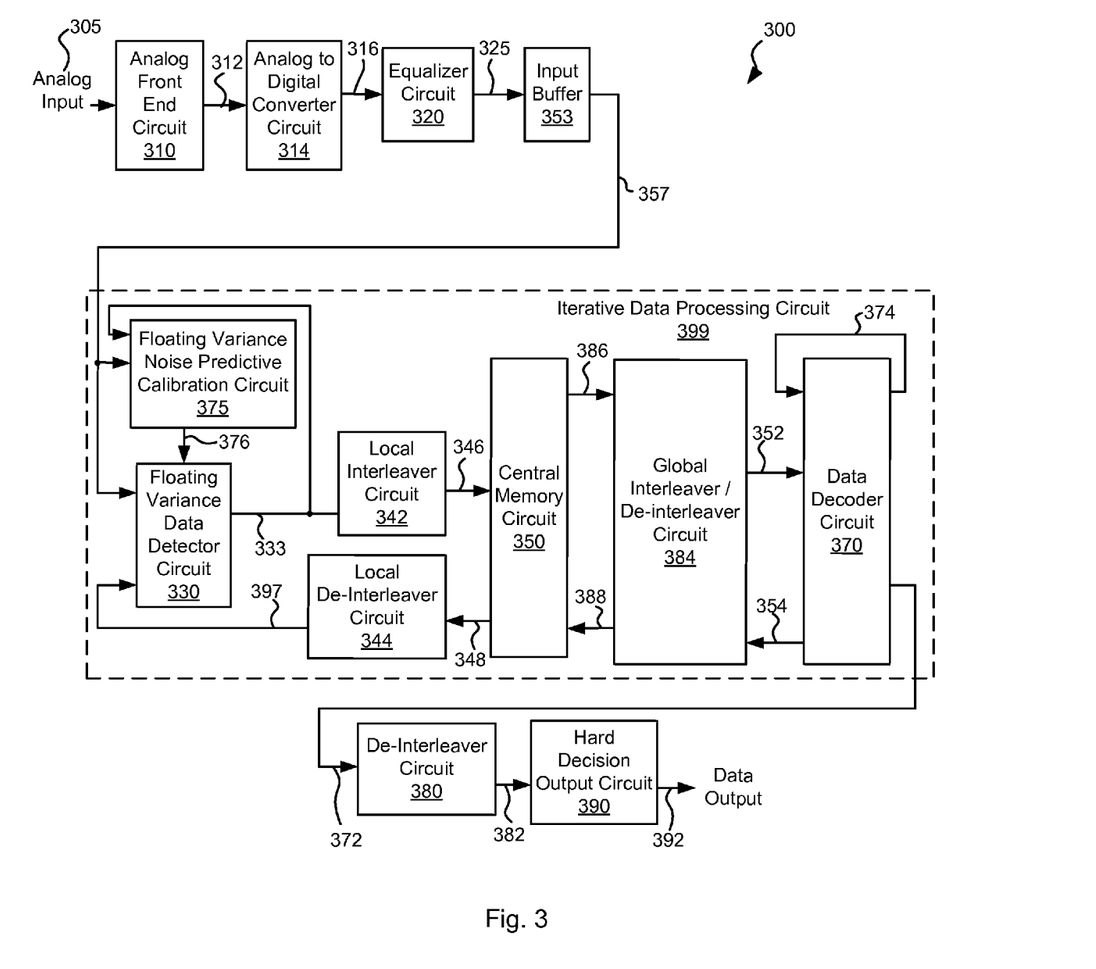
FIG. 3 shows a data processing circuit including floating variance calibration and detection circuitry in accordance with some embodiments of the present invention.

Turning to FIG. 3, a data processing circuit 300 including floating variance calibration and detection circuitry is shown in accordance with some embodiments of the present invention. Data decoding circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an equalizer circuit 320. Equalizer circuit 320 applies an equalization algorithm to digital samples 316 to yield an equalized output 325. In some embodiments of the present invention, equalizer circuit 320 is a digital finite impulse response filter circuit as are known in the art. It may be possible that equalized output 325 may be received directly from a storage device in, for example, a solid state storage system. In such cases, analog front end circuit 310, analog to digital converter circuit 314 and equalizer circuit 320 may be eliminated where the data is received as a digital data input.

Equalized output 325 is stored to an input buffer 353 that includes sufficient memory to maintain one or more codewords until processing of that codeword is completed through an iterative data processing circuit 399 (outlined by dashed lines) including, where warranted, multiple global iterations (passes through both a floating variance data detector circuit 330 and a data decoder circuit 370) and/or local iterations (passes through multi-level decoder circuit 399 during a given global iteration).

Floating variance data detector circuit 330 is operable to apply a data detection algorithm to a data set accessed from input buffer 353 as a detector input 357. Floating variance data detector circuit 330 may be a single data detector circuit or may be two or more data detector circuits operating in parallel on different codewords. Whether it is a single data detector circuit or a number of data detector circuits operating in parallel, floating variance data detector circuit 330 is operable to apply a data detection algorithm to detector input 357. In some embodiments of the present invention, data detector circuit 330 is a maximum a posteriori data detector circuit as are known in the art. Of note, the general phrases "maximum a posteriori data detection algorithm" or "maximum a posteriori data detector circuit" are used in their broadest sense to mean any data detection algorithm or detector circuit or variations thereof capable of utilizing branch metric values in making hard and/or soft decisions. Based upon the disclosure provided herein, one of ordinary skill in the art will recognize a variety of data detector circuits that may be used in relation to different embodiments of the present invention.

Floating variance data detector circuit 330 includes a number of noise predictive filter circuits each tuned for a particular condition, and floating variance branch metric calculation circuits operable to calculate respective branch metric values based upon input parameters 376 provided from a floating variance calibration circuit 375. Input parameters 376 include filter coefficients used to govern operation of the noise predictive filters, and/or a variance value corresponding to data of the condition supported by the respective noise predictive filters. As shown, floating variance calibration circuit 375 uses a detector output 333 from floating variance data detector circuit 330 to generate input parameters 376. The combination of floating variance data detector circuit 330 and floating variance calibration circuit 375 are discussed in more detail below in relation to FIGS. 4a-4c.

Upon completion of application of the data detection algorithm to the received data set data detector circuit 333 provides detector output 333. Detector output 333 includes soft data. As used herein, the phrase "soft data" or "soft decisions" are used in the broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detector output 333 is provided to a local interleaver circuit 342. Local interleaver circuit 342 is operable to shuffle sub-portions (i.e., local chunks) of the data set included as detected output 333 and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once data decoder circuit 370 is available, a previously stored interleaved codeword 346 is accessed from central memory circuit 350 as a stored codeword 386 and globally interleaved by a global interleaver/de-interleaver circuit 384. Global interleaver/De-interleaver circuit 384 may be any circuit known in the art that is capable of globally rearranging codewords. Global interleaver/De-interleaver circuit 384 provides a decoder input 352 into data decoder circuit 370. Data decoder circuit 370 applies a data decoding algorithm to the received input to yield an interim decoded output 374. In some embodiments of the present invention, data decoder circuit 370 is a low density parity check decoder circuit as are known in the art. Based upon the disclosure provided herein, one of ordinary skill in the art will recognize a variety of data decoder circuits that may be used in relation to different embodiments of the present invention.

Where interim decoded output 374 fails to converge (i.e., fails to yield an originally written data set), it is determined whether another local iteration (i.e., another pass through data decoder circuit 370) is allowed. Where another local iteration is to be applied, interim decoded output 374 is provided as a feedback to low data decoder circuit 370. This continues until either a maximum number of local iterations is exceeded or interim decoded output 374 converges (i.e., yields the originally written data set). Where data decoder circuit 370 is a low density parity check decoder circuit, such convergence of interim decoded output 374 is found where all of the parity check equations applied as part of the data decoding algorithm are satisfied.

Where interim decoded output 374 fails to converge and a number of local iterations through data decoder circuit 370 exceeds a threshold, the resulting interim decoded output is provided as a decoded output 354 back to central memory circuit 350 where it is stored awaiting another global iteration through a data detector circuit included in floating variance data detector circuit 330. Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in floating variance data detector circuit 330 becomes available, a previously stored de-interleaved output 388 accessed from central memory circuit 350 and locally de-interleaved by a de-interleaver circuit 344. De-interleaver circuit 344 re-arranges decoder output 348 to reverse the shuffling originally performed by interleaver circuit 342. A resulting de-interleaved output 397 is provided to data detector circuit 330 where it is used to guide subsequent detection of a corresponding data set previously received as equalized output 325.

Alternatively, where interim decoded output 374 converges it is provided as an output codeword 372 to a de-interleaver circuit 380. De-interleaver circuit 380 rearranges the data to reverse both the global and local interleaving applied to the data to yield a de-interleaved output 382. De-interleaved output 382 is provided to a hard decision output circuit 390. Hard decision output circuit 390 is operable to re-order data sets that may complete out of order back into their original order, with the originally ordered data sets being provided as a data output 392.

Using such a data processing system, adaptive updating of one or both of the noise predictive filter circuits and/or the branch floating variance branch metric calculation circuits is done via an update of input parameters 376 from floating variance calibration circuit 375. In some embodiments of the present invention, detector input 357 is accessed one sector of data at a time from input buffer. In such embodiments, floating variance calibration circuit 375 calculates updated versions of input parameters 376 using data corresponding to a sector of data, and provides the updated input parameters 376 between the transition from one sector to the next. As such, updated input parameters 376 are used by floating variance data detector circuit 330 during processing of next sector of data. Again, the combination of floating variance data detector circuit 330 and floating variance calibration circuit 375 are discussed in more detail below in relation to FIGS. 4a-4b.

Figure 4A:
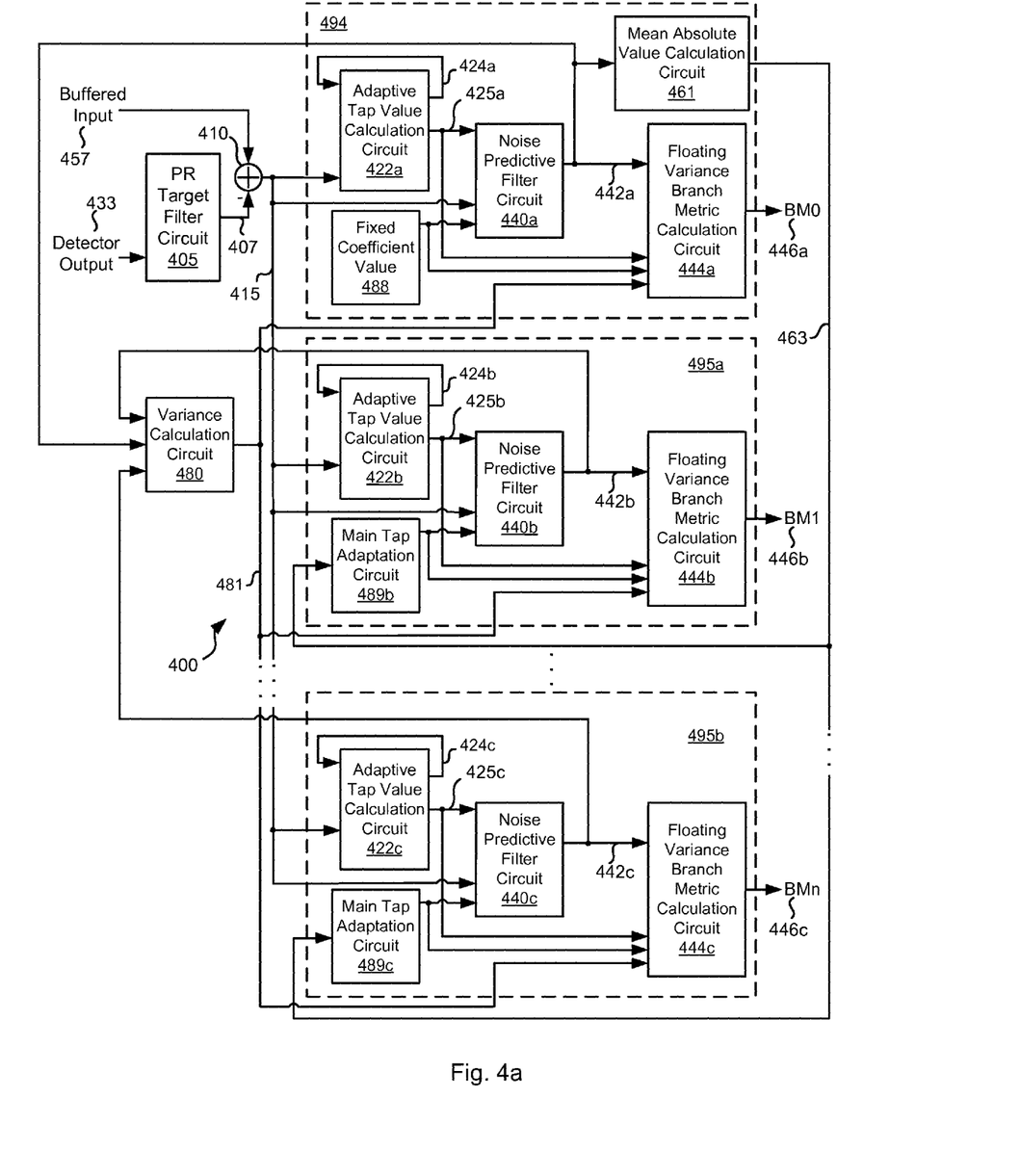
FIGS. 4a-4b show two different implementations of floating variance calibration and detection circuitry that may be used in relation to different embodiments of the present invention.

Turning to FIG. 4a, a floating variance calibration and detection circuit 400 including overall variance based branch metric calculation coupled with standard main tap adaptation is shown in accordance with some embodiments of the present invention. Floating variance calibration and detection circuit 400 may be used in place of floating variance calibration circuit 375 and the noise predictive filter circuits and branch metric calculation circuits of floating variance data detector circuit 330 discussed above in relation to FIG. 3. Where such is the case, detector input 357 of FIG. 3 is connected to a buffered input 457, and detector output 333 of FIG. 3 is connected to a detector output 433. Various branch metric values (i.e., BM0 446a, BM1 446b, BMn 446c) are used by floating variance data detector circuit 330 to generate decisions provided as detector output 333.

Floating variance calibration and detection circuit 400 includes a partial response (PR) target filter circuit 405 that applies target filtering to detector output 433 to yield an ideal output 407. Corresponding instances of ideal output 407 are subtracted buffered input 457 using a summation circuit 410 to yield an input error 415. Input error 415 is provided to multiple calibration and calculation circuits (i.e., calibration and calculation circuits 494, 495a, 495b). Each of the multiple calibration and calculation circuits is responsible for updating parameters related to branch metric calculation, and for calculating the branch metric. In particular, calibration and calculation circuit 494 is operable to calculate a first branch metric (i.e., BM0 446a), calibration and calculation circuit 495a is operable to calculate a second branch metric (i.e., BM1 446b), and calibration and calculation circuit 495b is operable to calculate a second branch metric (i.e., BMn 446c). In some embodiments of the present invention, n is eight (8). In other embodiments, the value of n is sixteen (16). Based upon the disclosure provided herein, one of ordinary skill in the art will recognize a variety of numbers of branch metric values that may be used in relation to different embodiments of the present invention. In addition, floating variance calibration and detection circuit 400 includes a variance calculation circuit 480 that is operable to calculate a variance of filtered outputs 442a, 442b, 442c (also referred to herein as tap feedback errors). The calculated variance is provided as a variance value 481 to each of the calibration and calculation circuits (i.e., calibration and calculation circuits 494, 495a, 495b).

Calibration and calculation circuit 494 includes four tap values (tap values $f_1, f_2, f_3$ 425a; and a fixed tap value $f_0$ 488) that are provided to a floating variance branch metric calculation circuit 444a. Three of the tap values (tap values $f_1, f_2, f_3$ 425a) are adaptively updated by an adaptive tap value calculation circuit 422a, and the fourth tap value (tap value $f_0$ 488) is a fixed or programmable value. In one particular embodiment of the present invention, tap value $f_0$ 488 is a maximum value. In some cases, the maximum value is $2^5-1$. Based upon the disclosure provided herein, one of ordinary skill in the art will recognize a variety of values to which tap value $f_0$ 488 may be fixed or programmed.

Adaptive tap value calculation circuit 422a adaptively modifies tap values $f_1, f_2, f_3$ 425a to reduce a noise error 424a. In one particular embodiment of the present invention, tap values $f_1, f_2, f_3$ 425a are adapted in accordance with the following updating equation:

$$f_i = f_i - u(\text{noise error } 424a * (\text{input error } 415)[k-i]).$$

where u is a damping factor, k is an instance in time, and i is a value of 1, 2 or 3; and * indicates the convolution of the noise error and the input error. Adaptive tap value calculation circuit 422a may be any circuit known in the art that is capable of adjusting tap values $f_1, f_2, f_3$ 425a based upon a feedback value.

A noise predictive filter circuit 440a applies noise predictive filtering to input error 415 based upon the four tap values (tap values $f_1, f_2, f_3$ 425a and tap value $f_0$ 488) to yield a filtered output 442a. Filtered output 442a is provided to a mean absolute value calculation circuit 461 that calculates a mean absolute value output 463 in accordance with the following equation:

$$\text{Mean Absolute Value } 463 = \frac{\sum_{i=0}^{n-1} \text{Filtered Output } 442a_i}{n}.$$

In addition, filtered output 442a is provided to variance calculation circuit 480.

Tap values $f_1, f_2, f_3$ 425a, tap value 488, variance value 481, and filtered output 442a are provided to floating variance branch metric calculation circuit 444a which is operable to calculating branch metric value 446a. Branch metric value 446a is calculated in accordance with the following equation:

$$\text{Branch Metric} = \frac{[(\text{input } 457) * (f_0, f_1, f_2, f_3) - edgemean]^2}{\text{Divisor}} (\text{Scalar Value}),$$

where * indicates the convolution of the input error using tap values $f_1, f_2, f_3$ 425a and tap value $f_0$ 488 (of note, the convolution of the input error using tap values $f_1, f_2, f_3$ 425a and tap value $f_0$ 488 is filtered output 442a), the Divisor is a user programmable value (e.g., 4, 8, 16), and the Scalar Value is calculated based upon variance value 481. The edgemean includes $y_{ideal}*(f_0, f_1, f_2, f_3)$. In particular, the Scalar Value is calculated in accordance with the following equation:

$$\text{Scalar Value} = \frac{\text{Register Value}}{\text{Variance Value } 481},$$

where the Register Value is a user programmable value. In some embodiments of the present invention, the Register Value is sixteen (16). Based upon the disclosure provided herein, one of ordinary skill in the art will recognize other values for the Register Value. By calculating the branch metric value this way, different values of the Register Value (corresponding to a normalized variance value) may be used for different global iterations for one or both of error floor mitigation and signal to nose ratio variation.

Calibration and calculation circuit 495a includes four tap values (tap values $f_1, f_2, f_3$ 425b; and an adapted main tap value $f_0$ 489b) that are provided to a floating variance branch metric calculation circuit 444b. Three of the tap values (tap values $f_1, f_2, f_3$ 425b) are adaptively updated by an adaptive tap value calculation circuit 422b, and the fourth tap value (tap value $f_0$ 489b) is adapted based upon mean absolute value output 443. Main tap adaptation circuit 489b may be any circuit known in the art that is capable of adapting a tap value to match a mean input.

Adaptive tap value calculation circuit 422b adaptively modifies tap values $f_1, f_2, f_3$ 425b to reduce a noise error 424b. In one particular embodiment of the present invention, tap values $f_1, f_2, f_3$ 425b are adapted in accordance with the following updating equation:

$$f_i = f_i - u(\text{noise error } 424b * (\text{input error } 415)[k-i]),$$

where u is a damping factor, k is an instance in time, and i is a value of 1, 2 or 3; and * indicates the convolution of the noise error and the input error. Adaptive tap value calculation circuit 422b may be any circuit known in the art that is capable of adjusting tap values $f_1, f_2, f_3$ 425b based upon a feedback value. A noise predictive filter circuit 440b applies noise predictive filtering to input error 415 based upon the four tap values (tap values $f_1, f_2, f_3$ 425b and tap value $f_0$ 489b) to yield a filtered output 442b. Filtered output 442b is provided to variance calculation circuit 480.

Tap values $f_1, f_2, f_3$ 425b, tap value 489b, variance value 481, and filtered output 442b are provided to floating variance branch metric calculation circuit 444b which is operable to calculating branch metric value 446b. Branch metric value 446b is calculated in accordance with the following equation:

Branch Metric =

$$\frac{[(\text{input } 457) * (f_0, f_1, f_2, f_3) - edgemean]^2}{\text{Divisor}} (\text{Scalar Value}),$$

where * indicates the convolution of the input error using tap values $f_1$, $f_2$, $f_3$ 425b and tap value $f_0$ 489b (of note, the convolution of the input error using tap values $f_1$, $f_2$, $f_3$ 425b and tap value $f_0$ 489b is filtered output 442b), the Divisor is a user programmable value (e.g., 4, 8, 16), and the Scalar Value is calculated based upon variance value 481. In particular, the Scalar Value is calculated in accordance with the following equation:

$$\text{Scalar Value} = \frac{\text{Register Value}}{\text{Variance Value } 481},$$

where the Register Value is a user programmable value. In some embodiments of the present invention, the Register Value is sixteen (16). Based upon the disclosure provided herein, one of ordinary skill in the art will recognize other values for the Register Value. Again, by calculating the branch metric value this way, different values of the Register Value (corresponding to a normalized variance value) may be used for different global iterations for one or both of error floor mitigation and signal to nose ratio variation.

Calibration and calculation circuit 495b includes four tap values (tap values $f_1$, $f_2$, $f_3$ 425c; and an adapted main tap value $f_0$ 489c) that are provided to a floating variance branch metric calculation circuit 444c. Three of the tap values (tap values $f_1$, $f_2$, $f_3$ 425c) are adaptively updated by an adaptive tap value calculation circuit 422c, and the fourth tap value (tap value $f_0$ 489c) is adapted based upon mean absolute value output 443. Main tap adaptation circuit 489b may be any circuit known in the art that is capable of adapting a tap value to match a mean input.

Adaptive tap value calculation circuit 422c adaptively modifies tap values $f_1$, $f_2$, $f_3$ 425c to reduce a noise error 424c. In one particular embodiment of the present invention, tap values $f_1$, $f_2$, $f_3$ 425c are adapted in accordance with the following updating equation:

$$f_i = f_i - u(\text{noise error } 424c * (\text{input error } 415)[k-i]),$$

where u is a damping factor, k is an instance in time, and i is a value of 1, 2 or 3; and * indicates the convolution of the noise error and the input error. Adaptive tap value calculation circuit 422c may be any circuit known in the art that is capable of adjusting tap values $f_1$, $f_2$, $f_3$ 425c based upon a feedback value. A noise predictive filter circuit 440c applies noise predictive filtering to input error 415 based upon the four tap values (tap values $f_1$, $f_2$, $f_3$ 425c and tap value $f_0$ 489c) to yield a filtered output 442c. In addition, filtered output 442c is provided to variance calculation circuit 480.

Tap values $f_1$, $f_2$, $f_3$ 425c, tap value 489c, variance value 481, and filtered output 442c are provided to floating variance branch metric calculation circuit 444b which is operable to calculating branch metric value 446c. Branch metric value 446c is calculated in accordance with the following equation:

Branch Metric =

$$\frac{[(\text{input } 457) * (f_0, f_1, f_2, f_3) - edgemean]^2}{\text{Divisor}} (\text{Scalar Value}),$$

where * indicates the convolution of the input error using tap values $f_1$, $f_2$, $f_3$ 425c and tap value $f_0$ 489c (of note, the convolution of the input error using tap values $f_1$, $f_2$, $f_3$ 425c and tap value $f_0$ 489c is filtered output 442c), the Divisor is a user programmable value (e.g., 4, 8, 16), and the Scalar Value is calculated based upon variance value 481. In particular, the Scalar Value is calculated in accordance with the following equation:

$$\text{Scalar Value} = \frac{\text{Register Value}}{\text{Variance Value } 481},$$

where the Register Value is a user programmable value. In some embodiments of the present invention, the Register Value is sixteen (16). Based upon the disclosure provided herein, one of ordinary skill in the art will recognize other values for the Register Value. Again, by calculating the branch metric value this way, different values of the Register Value (corresponding to a normalized variance value) may be used for different global iterations for one or both of error floor mitigation and signal to nose ratio variation.

Figure 4B:
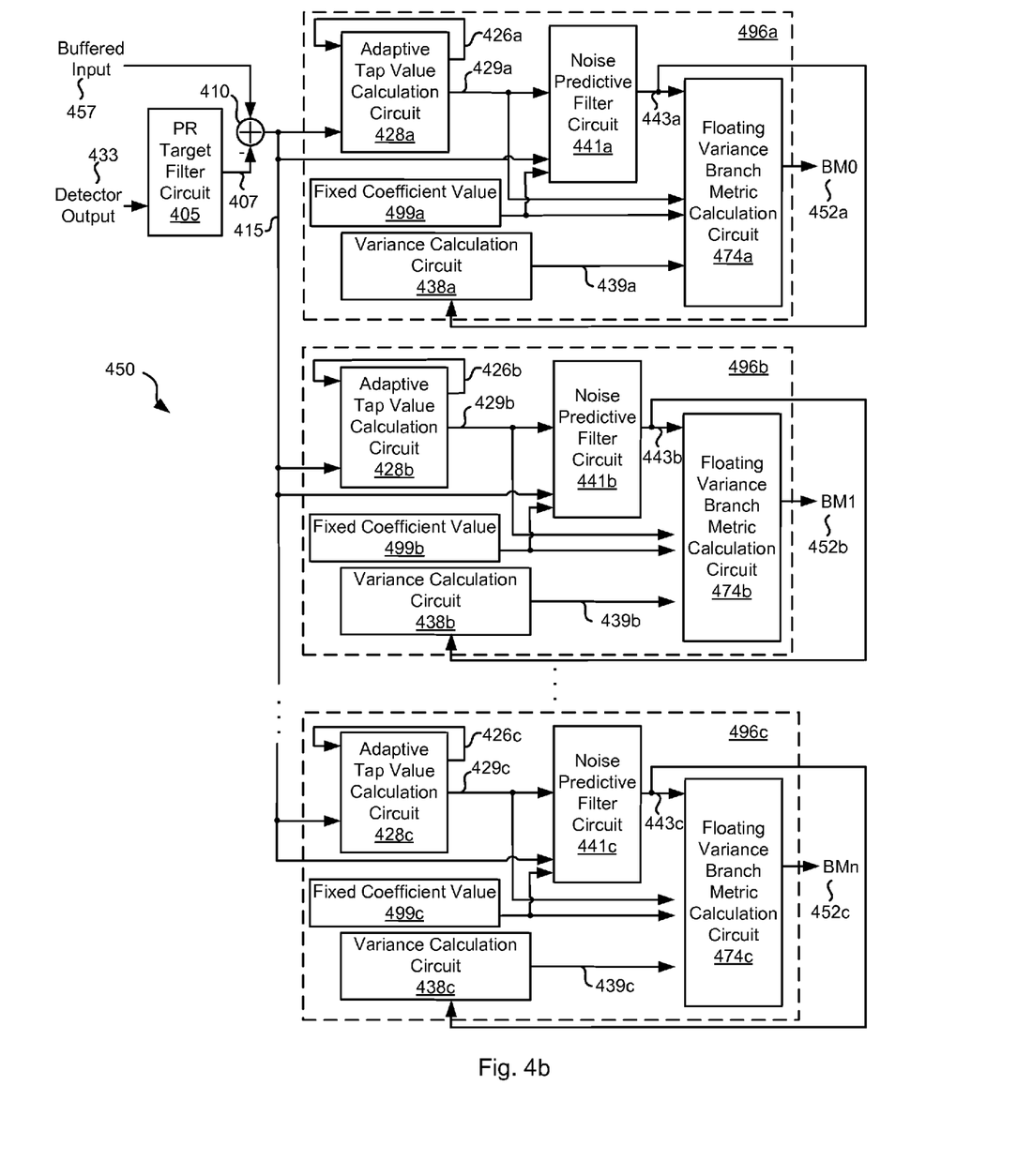

Turning to FIG. 4b, a floating variance calibration and detection circuit 450 including variance scaling is shown in accordance with some embodiments of the present invention. Floating variance calibration and detection circuit 450 may be used in place of floating variance calibration circuit 375 and the noise predictive filter circuits and branch metric calculation circuits of floating variance data detector circuit 330 discussed above in relation to FIG. 3. Where such is the case, detector input 357 of FIG. 3 is connected to a buffered input 457, and detector output 333 of FIG. 3 is connected to a detector output 433. Various branch metric values (i.e., BM0 452a, BM1 452b, BMn 452c) are used by floating variance data detector circuit 330 to generate decisions provided as detector output 333.

Floating variance calibration and detection circuit 450 includes a partial response (PR) target filter circuit 405 that applies target filtering to detector output 433 to yield an ideal output 407. Corresponding instances of ideal output 407 are subtracted buffered input 457 using a summation circuit 410 to yield an input error 415. Input error 415 is provided to multiple calibration and calculation circuits (i.e., calibration and calculation circuits 496a, 496b, 496c). Each of the multiple calibration and calculation circuits is responsible for updating parameters for calculating a respective branch metric, and for calculating the branch metric. In particular, calibration and calculation circuit 496a is operable to calculate a first branch metric (i.e., BM0 452a), calibration and calculation circuit 496b is operable to calculate a second branch metric (i.e., BM1 452b), and calibration and calculation circuit 496c is operable to calculate a second branch metric (i.e., BMn 452c). In some embodiments of the present invention, n is eight (8). In other embodiments, the value of n is sixteen (16). Based upon the disclosure provided herein, one of ordinary skill in the art will recognize a variety of numbers of branch metric values that may be used in relation to different embodiments of the present invention.

Calibration and calculation circuit 496a includes four tap values (tap values $f_1$, $f_2$, $f_3$ 429a; and tap value $f_0$ 499a) that are provided to a floating variance branch metric calculation circuit 474a. Three of the tap values (tap values $f_1$, $f_2$, $f_3$ 429a) are adaptively updated by an adaptive tap value calculation circuit 428a that adaptively modifies tap values $f_1$, $f_2$, $f_3$ 429a to reduce a noise error 426a. In one particular embodiment of the present invention, tap values $f_1$, $f_2$, $f_3$ 429a are adapted in accordance with the following updating equation:

$$f_i = f_i - u(\text{noise error } 426a * (\text{input error } 415)[k-i]),$$

where u is a damping factor, k is an instance in time, and i is a value of 1, 2 or 3; and * indicates the convolution of the noise error and the input error. Adaptive tap value calculation circuit 428a may be any circuit known in the art that is capable of adjusting tap values $f_1$, $f_2$, $f_3$ 429a based upon a feedback value.

A noise predictive filter circuit 441a applies noise predictive filtering to input error 415 based upon the four tap values (tap values $f_1$, $f_2$, $f_3$ 429a and tap value $f_0$ 489a) to yield a filtered output 443a. A variance calculation circuit 438a calculates a variance value 439a that combines the instances of filtered output 443a that meet the condition of calibration and calculation circuit 496c (i.e., a '1' condition). In some embodiments of the present invention, variance is calculated in accordance with the following equation:

Variance Value $439a(k)$=gain*(noise error$426a(k)$)$^2$+
(1−gain)*Variance Value $439a(k-1)$, where the gain is a user programmable gain, k indicates the particular instance of the variance and the noise error, and k−1 indicates the preceding instance. Based upon the disclosure provided herein, one of ordinary skill in the art will recognize other approaches for calculating variance that may be used in relation to different embodiments of the present invention. The fourth tap value (tap value $f_0$ 499a) may be a fixed or programmable value. In one particular embodiment of the present invention, tap value $f_0$ 499a is a maximum value. In some cases, the maximum value is $2^5-1$. Based upon the disclosure provided herein, one of ordinary skill in the art will recognize a variety of values to which tap value $f_0$ 499a may be fixed or programmed.

Tap values $f_1$, $f_2$, $f_3$ 429a, tap value 489a, variance value 439a, and filtered output 443a are provided to floating variance branch metric calculation circuit 474a which is operable to calculating branch metric value 452a. Branch metric value 452a is calculated in accordance with the following equation:

$$\text{Branch Metric} = \frac{[(\text{input } 457) * (f_0, f_1, f_2, f_3) - edgemean]^2}{\text{Divisor}} (\text{Scalar Value}),$$

where * indicates the convolution of the input error using tap values $f_1$, $f_2$, $f_3$ 429a and tap value $f_0$ 489a (of note, the convolution of the input error using tap values $f_1$, $f_2$, $f_3$ 429a and tap value $f_0$ 499a is filtered output 443a), the Divisor is a user programmable value (e.g., 4, 8, 16), and the Scalar Value is calculated based upon variance value 439a. In particular, the Scalar Value is calculated in accordance with the following equation:

$$\text{Scalar Value} = \frac{\text{Register Value}}{\text{Variance Value } 439a},$$

where the Register Value is a user programmable value. In some embodiments of the present invention, the Register Value is sixteen (16). Based upon the disclosure provided herein, one of ordinary skill in the art will recognize other values for the Register Value. By calculating the branch metric value this way, different values of the Register Value (corresponding to a normalized variance value) may be used for different global iterations for one or both of error floor mitigation and signal to nose ratio variation. In addition, the variance value covering the actual condition is used, thus increasing the dynamic range of the circuit.

Calibration and calculation circuit 496b includes four tap values (tap values $f_1$, $f_2$, $f_3$ 429b; and tap value $f_0$ 499b) that are provided to a floating variance branch metric calculation circuit 474b. Three of the tap values (tap values $f_1$, $f_2$, $f_3$ 429b) are adaptively updated by an adaptive tap value calculation circuit 428b that adaptively modifies tap values $f_1$, $f_2$, $f_3$ 429b to reduce a noise error 426b. In one particular embodiment of the present invention, tap values $f_1$, $f_2$, $f_3$ 429b are adapted in accordance with the following updating equation:

$f_i=f_i-u$(noise error $426b$*(input error $415$)$[k-i]$), where u is a damping factor, k is an instance in time, and i is a value of 1, 2 or 3; and * indicates the convolution of the noise error and the input error. Adaptive tap value calculation circuit 428b may be any circuit known in the art that is capable of adjusting tap values $f_1$, $f_2$, $f_3$ 429b based upon a feedback value.

A noise predictive filter circuit 441b applies noise predictive filtering to input error 415 based upon the four tap values (tap values $f_1$, $f_2$, $f_3$ 429b and tap value $f_0$ 489b) to yield a filtered output 443b. A variance calculation circuit 438b calculates a variance value 439b that combines the instances of filtered output 443b that meet the condition of calibration and calculation circuit 496c (i.e., a '1' condition). In some embodiments of the present invention, variance is calculated in accordance with the following equation:

Variance Value $439b(k)$=gain*(noise error$426b(k)$)$^2$+
(1−gain)*Variance Value $439b(k-1)$, where the gain is a user programmable gain, k indicates the particular instance of the variance and the noise error, and k−1 indicates the preceding instance. Based upon the disclosure provided herein, one of ordinary skill in the art will recognize other approaches for calculating variance that may be used in relation to different embodiments of the present invention. The fourth tap value (tap value $f_0$ 499b) may be a fixed or programmable value. In one particular embodiment of the present invention, tap value $f_0$ 499b is a maximum value. In some cases, the maximum value is $2^5-1$. Based upon the disclosure provided herein, one of ordinary skill in the art will recognize a variety of values to which tap value $f_0$ 499b may be fixed or programmed.

Tap values $f_1$, $f_2$, $f_3$ 429b, tap value 489b, variance value 439b, and filtered output 443b are provided to floating variance branch metric calculation circuit 474b which is operable to calculating branch metric value 452b. Branch metric value 452b is calculated in accordance with the following equation:

$$\text{Branch Metric} = \frac{[(\text{input } 457) * (f_0, f_1, f_2, f_3) - edgemean]^2}{\text{Divisor}} (\text{Scalar Value}),$$

where * indicates the convolution of the input error using tap values $f_1$, $f_2$, $f_3$ 429b and tap value $f_0$ 489b (of note, the convolution of the input error using tap values $f_1$, $f_2$, $f_3$ 429b and tap value $f_0$ 499b is filtered output 443b), the Divisor is a user programmable value (e.g., 4, 8, 16), and the Scalar Value is calculated based upon variance value 439b. In particular, the Scalar Value is calculated in accordance with the following equation:

$$\text{Scalar Value} = \frac{\text{Register Value}}{\text{Variance Value } 439b},$$

where the Register Value is a user programmable value. In some embodiments of the present invention, the Register Value is sixteen (16). Based upon the disclosure provided herein, one of ordinary skill in the art will recognize other values for the Register Value. By calculating the branch metric value this way, different values of the Register Value (corresponding to a normalized variance value) may be used for different global iterations for one or both of error floor mitigation and signal to nose ratio variation. In addition, the variance value covering the actual condition is used, thus increasing the dynamic range of the circuit.

Calibration and calculation circuit 496c includes four tap values (tap values $f_1, f_2, f_3$ 429c; and tap value $f_0$ 499c) that are provided to a floating variance branch metric calculation circuit 474c. Three of the tap values (tap values $f_1, f_2, f_3$ 429c) are adaptively updated by an adaptive tap value calculation circuit 428c that adaptively modifies tap values $f_1, f_2, f_3$ 429c to reduce a noise error 426c. In one particular embodiment of the present invention, tap values $f_1, f_2, f_3$ 429c are adapted in accordance with the following updating equation:

$$f_i = f_i - u(\text{noise error } 426c \ast (\text{input error } 415)[k-i]),$$

where u is a damping factor, k is an instance in time, and i is a value of 1, 2 or 3; and * indicates the convolution of the noise error and the input error. Adaptive tap value calculation circuit 428c may be any circuit known in the art that is capable of adjusting tap values $f_1, f_2, f_3$ 429c based upon a feedback value.

A noise predictive filter circuit 441c applies noise predictive filtering to input error 415 based upon the four tap values (tap values $f_1, f_2, f_3$ 429c and tap value $f_0$ 489c) to yield a filtered output 443c. A variance calculation circuit 438c calculates a variance value 439c that combines the instances of filtered output 443c that meet the condition of calibration and calculation circuit 496c (i.e., an 'n' condition). In some embodiments of the present invention, variance is calculated in accordance with the following equation:

Variance Value 439c(k)=gain*(noise error426c(k))²+
(1−gain)*Variance Value 439c(k−1), where the gain is a user programmable gain, k indicates the particular instance of the variance and the input error, and k−1 indicates the preceding instance. Based upon the disclosure provided herein, one of ordinary skill in the art will recognize other approaches for calculating variance that may be used in relation to different embodiments of the present invention. The fourth tap value (tap value $f_0$ 499c) may be a fixed or programmable value. In one particular embodiment of the present invention, tap value $f_0$ 499c is a maximum value. In some cases, the maximum value is $2^5-1$. Based upon the disclosure provided herein, one of ordinary skill in the art will recognize a variety of values to which tap value $f_0$ 499c may be fixed or programmed.

Tap values $f_1, f_2, f_3$ 429c, tap value 489c, variance value 439c, and filtered output 443c are provided to floating variance branch metric calculation circuit 474c which is operable to calculating branch metric value 452c. Branch metric value 452c is calculated in accordance with the following equation:

$$\text{Branch Metric} = \frac{[(\text{input } 457) \ast (f_0, f_1, f_2, f_3) - \text{edgemean}]^2}{\text{Divisor}} (\text{Scalar Value}),$$

where * indicates the convolution of the input error using tap values $f_1, f_2, f_3$ 429c and tap value $f_0$ 489c (of note, the convolution of the input error using tap values $f_1, f_2, f_3$ 429c and tap value $f_0$ 499c is filtered output 443c), the Divisor is a user programmable value (e.g., 4, 8, 16), and the Scalar Value is calculated based upon variance value 439c. In particular, the Scalar Value is calculated in accordance with the following equation:

$$\text{Scalar Value} = \frac{\text{Register Value}}{\text{Variance Value } 439c},$$

where the Register Value is a user programmable value. In some embodiments of the present invention, the Register Value is sixteen (16). Based upon the disclosure provided herein, one of ordinary skill in the art will recognize other values for the Register Value. By calculating the branch metric value this way, different values of the Register Value (corresponding to a normalized variance value) may be used for different global iterations for one or both of error floor mitigation and signal to nose ratio variation. In addition, the variance value covering the actual condition is used, thus increasing the dynamic range of the circuit.

While not shown in a separate figure as it is very similar to that shown in FIG. 4b. The conditions monitored by each of calibration and calculation circuits 496 include both the positive and negative values of the condition. In other embodiments of the present invention, two distinct variance calculation circuits may be used in place of variance calculation circuit 438 to calculate a variance value specific to the positive side of the condition, and another variance value specific to the negative side of the condition. These two variance values are provided to the respective floating variance branch metric calculation circuits 474 where they are used to calculate two different branch metric outputs—one for the positive side and the other for the negative side. Such an approach mitigates asymmetric noise.

Figure 5A:
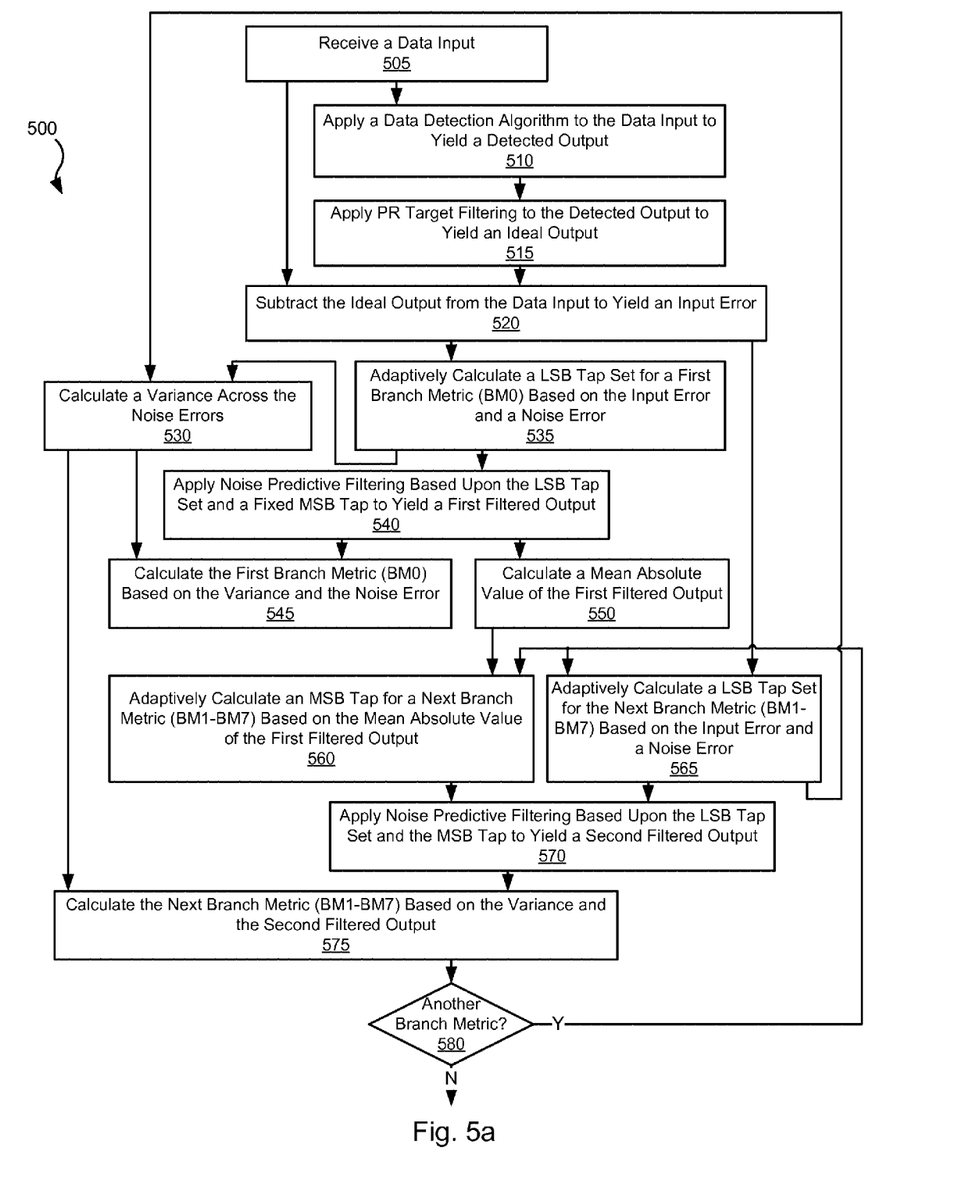
FIGS. 5a-5b are flow diagrams showing two different methods for data processing including floating variance calibration and branch metric calculation in accordance with some embodiments of the present invention.

Turning to FIG. 5a, a flow diagram 500 shows a method in accordance with some embodiments of the present invention for data processing including floating variance calibration and branch metric calculation using a common variance value for each calculated branch metric value in accordance with some embodiments of the present invention. Following flow diagram 500, a data input is received (block 505). This data input may be derived, for example, from a storage medium or a wireless data transfer medium. Based upon the disclosure provided herein, one of ordinary skill in the art will recognize a variety of sources from which the data input may be derived. In some particular embodiments, the data input is an equalized output provided from an equalizer circuit.

A data detection algorithm is applied to the received data input to yield a detected output (block 510). In some embodiments of the present invention, the data detection algorithm is a maximum a posteriori data detection algorithm or a Viterbi data detection algorithm as are known in the art. Based upon the disclosure provided herein, one of ordinary skill in the art will recognize a variety of data detection algorithms that may be used in relation to different embodiments of the present invention. Partial response target filtering is applied to the detected output to yield an ideal output (block 515), and the ideal output is subtracted from the data input to yield an input error (block 520). A variance is calculated across a number of instances of the input error (block 530). The variance may be calculated across thousands of instances of noise errors generated as part of adaptively calculating filter taps (blocks 535, 565 discussed below). Such an approach is costly as a great amount of information is stored. In other embodiments of the present invention, the variance is calculated in accordance with the following equation:

Variance Value($k$)=gain*(noise error($k$))$^2$+(1−gain)*
Variance Value($k$−1), where the gain is a user programmable gain, k indicates the particular instance of the variance and the input error, and k−1 indicates the preceding instance. Based upon the disclosure provided herein, one of ordinary skill in the art will recognize other approaches for calculating variance that may be used in relation to different embodiments of the present invention. A mean absolute value of the first filtered output (block 550). The calculation may be done in accordance with the following equation:

$$\text{Mean Absolute Value} = \frac{\sum_{i=0}^{n-1} \text{First Filtered } Output_i}{n},$$

where n is the total number of instances of the filtered output included in the calculation.

In addition, least significant bits of a tap set (e.g., $f_1$, $f_2$, $f_3$) are adaptively modified for a first branch metric value (BM0) (block 535). This adaptation yields a noise error that is driven toward zero. This same noise error is used in calculating the variance as discussed above. This adaptive modification of the least significant bits of the tap set may be done using any prior art approach for updating the taps. Noise predictive filtering is applied to the input error using the least significant bits of the tap set and a fixed value for the most significant bit of the tap set (e.g., $f_0$) to yield a first filtered output (block 540). The first branch metric (BM0) is then calculated based upon the filtered output and the variance (block 545). This branch metric may be calculated in accordance with the following equation:

$$\text{Branch Metric} = \frac{[(\text{input}) * (f_0, f_1, f_2, f_3) - edgemean]^2}{\text{Divisor}} (\text{Scalar Value}),$$

where * indicates the convolution of the input error using tap values $f_0$, $f_1$, $f_2$, $f_3$ (of note, the convolution of the input error using tap values $f_0$, $f_1$, $f_2$, $f_3$ is the first filtered output), the Divisor is a user programmable value (e.g., 4, 8, 16), and the Scalar Value is calculated based upon the variance value. In particular, the Scalar Value is calculated in accordance with the following equation:

$$\text{Scalar Value} = \frac{\text{Register Value}}{\text{Variance Value}},$$

where the Register Value is a user programmable value corresponding to a normalized variance value. In some embodiments of the present invention, the Register Value is sixteen (16). Based upon the disclosure provided herein, one of ordinary skill in the art will recognize other values for the Register Value. By calculating the branch metric value this way, different values of the Register Value may be used for different global iterations for one or both of error floor mitigation and signal to nose ratio variation. In addition, the variance value covering the actual condition is used, thus increasing the dynamic range of the circuit.

In addition, the main tap value for another of the branch metrics (BM1-BM7) based on the mean absolute value of the filtered output (block 560). This process is repeated for the main tap value for each of the branch metrics (BM1-BM7). Further, an LSB tap set is adaptively calculated for the corresponding branch metrics (BM1-BM7) based on the input error and a noise error (block 565). This adaptation yields a noise error that is driven toward zero. Noise predictive filtering is applied to the input error using the least significant bits of the tap set (e.g., $f_1$, $f_2$, $f_3$) and the adapted most significant bit of the tap set (e.g., $f_0$) to yield a second filtered output (block 570). The corresponding branch metric (BM1-BM7) is then calculated based upon the second filtered output and the variance (block 575). This branch metric may be calculated in accordance with the following equation:

$$\text{Branch Metric} = \frac{[(\text{input}) * (f_0, f_1, f_2, f_3) - edgemean]^2}{\text{Divisor}} (\text{Scalar Value}),$$

where * indicates the convolution of the input error using tap values $f_0$, $f_1$, $f_2$, $f_3$ (of note, the convolution of the input error using tap values $f_0$, $f_1$, $f_2$, $f_3$ is the second filtered output), the Divisor is a user programmable value (e.g., 4, 8, 16), and the Scalar Value is calculated based upon the variance value. In particular, the Scalar Value is calculated in accordance with the following equation:

$$\text{Scalar Value} = \frac{\text{Register Value}}{\text{Variance Value}},$$

where the Register Value is a user programmable value corresponding to a normalized variance value. In some embodiments of the present invention, the Register Value is sixteen (16). Based upon the disclosure provided herein, one of ordinary skill in the art will recognize other values for the Register Value. By calculating the branch metric value this way, different values of the Register Value may be used for different global iterations for one or both of error floor mitigation and signal to nose ratio variation. In addition, the variance value covering the actual condition is used, thus increasing the dynamic range of the circuit. Again, the processes of blocks 560-575 are repeated for each of the branch metrics (BM1-BM7)(block 580).

Figure 5B:
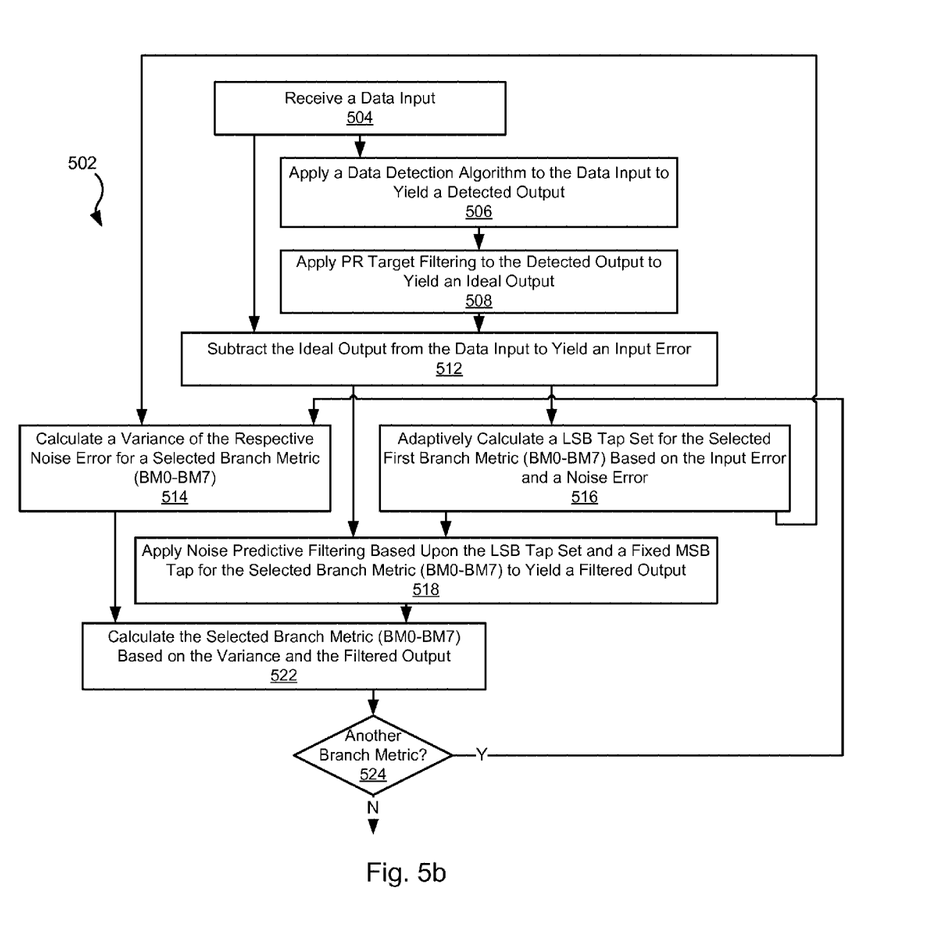

Turning to FIG. 5b, a flow diagram 502 shows a method in accordance with some embodiments of the present invention for data processing including floating variance calibration and branch metric calculation using a variance value specific to each calculated branch metric value in accordance with some embodiments of the present invention. Following flow diagram 502, a data input is received (block 504). This data input may be derived, for example, from a storage medium or a wireless data transfer medium. Based upon the disclosure provided herein, one of ordinary skill in the art will recognize a variety of sources from which the data input may be derived. In some particular embodiments, the data input is an equalized output provided from an equalizer circuit.

A data detection algorithm is applied to the received data input to yield a detected output (block 506). In some embodiments of the present invention, the data detection algorithm is a maximum a posteriori data detection algorithm or a Viterbi data detection algorithm as are known in the art. Based upon the disclosure provided herein, one of ordinary skill in the art will recognize a variety of data detection algorithms that may be used in relation to different embodiments of the present invention. Partial response target filtering is applied to the detected output to yield an ideal output (block 508), and the ideal output is subtracted from the data input to yield an input error (block 512). A variance is calculated across a number of instances of the noise error specific for the condition of the particular branch metric (BM0-BM7) being calculated (block 514). The variance may be calculated across thousands of instances of the input error. Such an approach is costly as a great amount of information is stored. In other embodiments of the present invention, the variance is calculated in accordance with the following equation:

$$\text{Variance Value}(k) = \text{gain}*(\text{noise error}(k))^2 + (1-\text{gain})* \text{Variance Value}(k-1),$$

where the gain is a user programmable gain, k indicates the particular instance of the variance and the input error, and k−1 indicates the preceding instance. Based upon the disclosure provided herein, one of ordinary skill in the art will recognize other approaches for calculating variance that may be used in relation to different embodiments of the present invention.

In addition, least significant bits of a tap set (e.g., $f_1$, $f_2$, $f_3$) are adaptively modified for a first branch metric value (BM0) (block 516). This adaptation yields a noise error that is driven toward zero. This same noise error is used in calculating the variance as discussed above. This adaptive modification of the least significant bits of the tap set may be done using any prior art approach for updating the taps. Noise predictive filtering is applied to the input error using the least significant bits of the tap set and a fixed value for the most significant bit of the tap set (e.g., $f_0$) to yield a filtered output (block 518). The currently calculating branch metric (BM0-BM7) is then calculated based upon the filtered output and the variance (block 522). This branch metric may be calculated in accordance with the following equation:

$$\text{Branch Metric} = \frac{[(\text{input}) * (f_0, f_1, f_2, f_3) - edgemean]^2}{\text{Divisor}} \text{(Scalar Value)},$$

where * indicates the convolution of the input error using tap values $f_0$, $f_1$, $f_2$, $f_3$ (of note, the convolution of the input error using tap values $f_0$, $f_1$, $f_2$, $f_3$ is the first filtered output), the Divisor is a user programmable value (e.g., 4, 8, 16), and the Scalar Value is calculated based upon the variance value. In particular, the Scalar Value is calculated in accordance with the following equation:

$$\text{Scalar Value} = \frac{\text{Register Value}}{\text{Variance Value}},$$

where the Register Value is a user programmable value corresponding to a normalized variance value. In some embodiments of the present invention, the Register Value is sixteen (16). Based upon the disclosure provided herein, one of ordinary skill in the art will recognize other values for the Register Value. By calculating the branch metric value this way, different values of the Register Value may be used for different global iterations for one or both of error floor mitigation and signal to nose ratio variation. In addition, the variance value covering the actual condition is used, thus increasing the dynamic range of the circuit. The processes of blocks 514-522 are repeated for each of the branch metrics (BM1-BM7) (block 524).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a variance calculation circuit operable to calculate a variance of a data input; and
    a branch metric calculation circuit operable to receive the data input separate from the variance, and to calculate a branch metric based at least in part on the variance.

2. The data processing system of claim 1, wherein the branch metric calculation circuit is a first branch metric calculation circuit, wherein the branch metric is a first branch metric, and wherein the system further comprises:
    a second branch metric calculation circuit operable to calculate a second branch metric based at least in part on the variance.

3. The data processing system of claim 2, wherein the system further comprises:
    a first adaptive tap calculation circuit operable to calculate a first portion of a first tap set based upon the data input, wherein a second portion of the first tap set is a tap value; and
    a first noise predictive filter operable to apply noise predictive filtering to the data input using the first tap set to yield a first filtered output, wherein the first branch metric calculation circuit is further operable to calculate the first branch metric based upon both the variance and the first filtered output.

4. The data processing system of claim 3, wherein the tap value is selected from a group consisting of: a fixed tap value, and a programmable tap value.

5. The data processing system of claim 3, the system further comprising:
    a mean absolute value calculation circuit operable to calculate a mean absolute value of the first filtered output;
    a second adaptive tap calculation circuit operable to calculate a first portion of a second tap set based upon the data input;
    a third adaptive tap calculation circuit operable to calculate a second portion of the second tap set based upon the mean absolute value of the first filtered output;
    a second noise predictive filter operable to apply noise predictive filtering to the data input using the second tap set to yield a second filtered output, wherein the second branch metric calculation circuit is further operable to calculate the second branch metric based upon both the variance and the second filtered output.

6. The data processing system of claim 1, wherein the branch metric calculation circuit is a first branch metric calculation circuit, wherein the branch metric is a first branch metric, wherein the variance is a first variance specific to a condition of the first branch metric, wherein the variance calculation circuit is a first variance calculation circuit, and wherein the system further comprises:
a second variance calculation circuit operable to calculate a second variance of the data input, wherein the second variance is specific to a condition of a second branch metric; and
a second branch metric calculation circuit operable to calculate a second branch metric based at least in part on the second variance.

7. The data processing system of claim 6, wherein the system further comprises:
a first adaptive tap calculation circuit operable to calculate a first portion of a first tap set based upon the data input, wherein a second portion of the first tap set is a first tap value; and
a first noise predictive filter operable to apply noise predictive filtering to the data input using the first tap set to yield a first filtered output, wherein the first branch metric calculation circuit is further operable to calculate the first branch metric based upon both the variance and the first filtered output.

8. The data processing system of claim 7, wherein the system further comprises:
a second adaptive tap calculation circuit operable to calculate a first portion of a second tap set based upon the data input, wherein a second portion of the second tap set is a second tap value; and
a second noise predictive filter operable to apply noise predictive filtering to the data input using the second tap set to yield a second filtered output, wherein the second branch metric calculation circuit is further operable to calculate the second branch metric based upon both the variance and the second filtered output.

9. The data processing system of claim 1, wherein the system further comprises:
a partial response target filter circuit operable to filter a detector output to yield an ideal output; and
a summation circuit operable to subtract the ideal output from a received input to yield the data input.

10. The data processing system of claim 1, wherein the system is implemented as an integrated circuit.

11. The data processing system of claim 1, wherein the data processing system is incorporated in a device selected from a group consisting of: a storage device, and a data communication device.

12. A method for data processing, the method comprising:
calculating a variance of a data input using a variance calculation circuit;
providing the data input and the variance separately to a branch metric calculation circuit; and
calculating a branch metric based at least in part on a combination of the variance and the data input.

13. The method of claim 12, wherein the branch metric is a first branch metric, and wherein the method further comprises:
calculating a second branch metric based at least in part on the variance.

14. The method of claim 13, the method further comprising:
adapting a first portion of a first tap set based upon the data input, wherein a second portion of the first tap set is a tap value; and
applying noise predictive filtering to the data input using the first tap set to yield a first filtered output, wherein the first branch metric is further based upon the first filtered output.

15. The method of claim 13, the method further comprising:
calculating a mean absolute value of the first filtered output;
adapting a first portion of a second tap set based upon the data input,
adapting a second portion of the second tap set based upon the mean absolute value of the first filtered output; and
applying noise predictive filtering to the data input using the second tap set to yield a second filtered output, wherein the second branch metric is further based upon the second filtered output.

16. The method of claim 12, wherein the branch metric is a first branch metric, wherein the variance is a first variance specific to a condition of the first branch metric, and wherein the method further comprises:
calculating a second variance of the data input, wherein the second variance is specific to a condition of a second branch metric; and
calculating a second branch metric based at least in part on the second variance.

17. The method of claim 16, the method further comprising:
adapting a first tap set based upon the data input; and
applying noise predictive filtering to the data input using the first tap set to yield a first filtered output, wherein the first branch metric is further based upon the first filtered output.

18. The method of claim 17, the method further comprising:
adapting a second tap set based upon the data input; and
applying noise predictive filtering to the data input using the second tap set to yield a second filtered output, wherein the second branch metric is further based upon the second filtered output.

19. A storage device, the storage device comprising:
a storage medium;
a head assembly disposed in relation to the storage medium and operable to provide an input signal corresponding to information on the storage medium;
a data processing circuit including:
a front end processing circuit operable to process the input signal to yield a data set from a location on the storage medium;
a data detector circuit operable to apply a data detection algorithm to the data set to yield a detected output;
a partial response target filter circuit operable to filter the detected output to yield an ideal output;
a summation circuit operable to subtract the ideal output from the data set to yield a data input;
a variance calculation circuit operable to calculate a variance of the data input; and
a branch metric calculation circuit operable to receive the data input separate from the variance of the data input, and to calculate a branch metric based at least in part on a combination of the data input and the variance, wherein the branch metric is used by the data detector circuit.

20. The storage device of claim 19, wherein the branch metric calculation circuit is a first branch metric calculation circuit, wherein the branch metric is a first branch metric, and wherein the system further comprises:

a second branch metric calculation circuit operable to calculate a second branch metric based at least in part on the variance.

* * * * *